US007702538B2

(12) United States Patent
Rau et al.

(10) Patent No.: US 7,702,538 B2
(45) Date of Patent: Apr. 20, 2010

(54) SYSTEM AND METHOD FOR TRANSPONDER-ENABLED ACCOUNT TRANSACTIONS

(75) Inventors: Scott W. Rau, Pottstown, PA (US); Scott Philp Bertetti, Wilmington, DE (US); Gerald A. Beechum, Jr., Chicago, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 10/143,581

(22) Filed: May 10, 2002

(65) Prior Publication Data

US 2003/0126017 A1 Jul. 3, 2003

Related U.S. Application Data

(62) Division of application No. 09/630,595, filed on Aug. 1, 2000.

(51) Int. Cl.
*G06G 1/12* (2006.01)
(52) U.S. Cl. .......................................... 705/21; 705/16
(58) Field of Classification Search .............. 705/16, 705/21
See application file for complete search history.

(56) References Cited

U.S. PATENT DOCUMENTS

| | | | |
|---|---|---|---|
| 3,438,489 A | 4/1969 | Cambornac et al. |
| 3,468,046 A | 9/1969 | Makishima |
| 3,532,543 A | 10/1970 | Nole |
| 3,537,195 A | 11/1970 | Gerds |
| 3,546,022 A | 12/1970 | Busch |
| 3,806,369 A | 4/1974 | Dey |
| 3,938,090 A | 2/1976 | Borison et al. |
| 4,058,839 A | 11/1977 | Darjany |
| 4,453,074 A | 6/1984 | Weinstein |
| 4,454,414 A | 6/1984 | Benton |
| 4,473,825 A | 9/1984 | Walton |
| 4,482,985 A | 11/1984 | Itoh |
| 4,523,297 A | 6/1985 | Ugon et al. |

(Continued)

FOREIGN PATENT DOCUMENTS

DE  42 39 562  6/1993

(Continued)

OTHER PUBLICATIONS

White, Ron, How Computers Work Millennium Ed. Que Corporation, Sep. 1999.*

(Continued)

*Primary Examiner*—Elaine Gort
(74) *Attorney, Agent, or Firm*—Hunton & Williams LLP

(57) ABSTRACT

A transponder-initiated transaction system is electromagnetically coupled to an account transponder device at the point of sale. The account transponder device may be embedded within a watch, key chain or other personal article for convenience or affinity. The transponder device may communicate account information to an RF-enabled point of sale device, enabling transactions to take place without resort to remote data processing facilities. In other embodiments partial or complete account information may be accessed or stored at co-located or remote sources. New account registrants may access a Web site to enter a transponder ID and activate a new account, which may be a credit account, debit account, cash account, special purpose vending account, or other types of accounts.

12 Claims, 5 Drawing Sheets

U.S. PATENT DOCUMENTS

| | | | |
|---|---|---|---|
| 4,544,834 A | 10/1985 | Newport | |
| 4,575,621 A | 3/1986 | Dreifus | |
| 4,582,985 A | 4/1986 | Lofberg | |
| 4,605,844 A | 8/1986 | Haggan | |
| 4,614,861 A | 9/1986 | Pavlov et al. | |
| 4,634,845 A | 1/1987 | Hale et al. | |
| 4,650,981 A | 3/1987 | Foletta | |
| 4,654,658 A | 3/1987 | Walton | |
| 4,689,478 A | 8/1987 | Hale | |
| 4,697,072 A | 9/1987 | Kawana | |
| 4,700,055 A * | 10/1987 | Kashkashian, Jr. | 235/379 |
| 4,701,601 A | 10/1987 | Francini et al. | |
| 4,722,054 A | 1/1988 | Yorozu et al. | |
| 4,746,787 A | 5/1988 | Okada | |
| 4,747,620 A | 5/1988 | Kay et al. | |
| 4,750,036 A | 6/1988 | Martinez | |
| 4,754,418 A | 6/1988 | Hara | |
| 4,766,293 A | 8/1988 | Boston | |
| 4,825,052 A | 4/1989 | Ugon | |
| 4,833,048 A | 5/1989 | Dejonghe | |
| 4,845,347 A | 7/1989 | McCrindle et al. | |
| 4,849,618 A | 7/1989 | Namikawa et al. | |
| 4,859,837 A | 8/1989 | Halpern | |
| 4,868,376 A | 9/1989 | Lessin | |
| 4,876,441 A | 10/1989 | Hara et al. | |
| 4,897,533 A | 1/1990 | Lysczcarz | |
| 4,899,036 A | 2/1990 | McCrindle et al. | |
| 4,916,296 A | 4/1990 | Streck | |
| 4,922,111 A | 5/1990 | Kuwano et al. | |
| 4,923,288 A | 5/1990 | Allen et al. | |
| 4,968,873 A | 11/1990 | Dethloff et al. | |
| 4,977,455 A | 12/1990 | Young | |
| 4,977,501 A | 12/1990 | Lefevre | |
| 4,999,617 A | 3/1991 | Uemura et al. | |
| 5,025,373 A | 6/1991 | Keyser, Jr. et al. | |
| 5,047,614 A | 9/1991 | Bianco | |
| 5,053,774 A | 10/1991 | Schuermann et al. | |
| 5,055,662 A | 10/1991 | Hasegawa | |
| 5,072,380 A | 12/1991 | Randelman et al. | |
| 5,080,748 A | 1/1992 | Bonomi | |
| 5,097,115 A | 3/1992 | Ogasawara | |
| 5,103,079 A | 4/1992 | Barakai et al. | |
| 5,107,100 A | 4/1992 | Shepard et al. | |
| 5,154,731 A | 10/1992 | Winger | |
| 5,162,175 A | 11/1992 | Visco et al. | |
| 5,168,151 A | 12/1992 | Nara | |
| 5,173,589 A | 12/1992 | Diehl et al. | |
| 5,191,193 A | 3/1993 | Le Roux | |
| 5,227,614 A | 7/1993 | Danielson et al. | |
| 5,233,654 A | 8/1993 | Harvey et al. | |
| 5,241,161 A | 8/1993 | Zuta | |
| 5,247,190 A | 9/1993 | Friend et al. | |
| 5,249,044 A | 9/1993 | Von Kohorn | |
| 5,252,815 A | 10/1993 | Pernet | |
| 5,253,345 A | 10/1993 | Fernandes et al. | |
| 5,257,486 A | 11/1993 | Holmwall | |
| 5,276,311 A | 1/1994 | Hennige | |
| 5,285,278 A | 2/1994 | Holman | |
| 5,286,955 A | 2/1994 | Klosa | |
| 5,287,181 A | 2/1994 | Holman | |
| 5,299,940 A | 4/1994 | Uenaka et al. | |
| 5,317,137 A | 5/1994 | Wilkins | |
| 5,321,240 A | 6/1994 | Takahira | |
| 5,328,809 A | 7/1994 | Holmes et al. | |
| 5,337,063 A | 8/1994 | Takahira | |
| 5,339,239 A | 8/1994 | Manabe et al. | |
| 5,340,969 A | 8/1994 | Cox | |
| 5,351,187 A | 9/1994 | Hassett | |
| 5,352,877 A | 10/1994 | Morley | |
| 5,357,563 A * | 10/1994 | Hamilton et al. | 379/91.01 |
| 5,359,183 A | 10/1994 | Skodlar | |
| 5,382,784 A | 1/1995 | Eberhardt | |
| 5,396,558 A | 3/1995 | Ishiguro et al. | |
| 5,396,650 A | 3/1995 | Terauchi | |
| 5,399,502 A | 3/1995 | Friend et al. | |
| 5,401,827 A | 3/1995 | Holmes et al. | |
| 5,412,192 A | 5/1995 | Hoss | |
| 5,425,497 A | 6/1995 | Sorensen | |
| 5,449,894 A | 9/1995 | Bruhnke et al. | |
| 5,450,479 A | 9/1995 | Alesio et al. | |
| 5,451,763 A | 9/1995 | Pickett et al. | |
| 5,479,172 A | 12/1995 | Smith et al. | |
| 5,479,494 A | 12/1995 | Clitherow | |
| 5,488,571 A | 1/1996 | Jacobs et al. | |
| 5,492,370 A | 2/1996 | Chatwin et al. | |
| 5,495,981 A | 3/1996 | Warther | |
| 5,500,890 A * | 3/1996 | Rogge et al. | 379/91.02 |
| 5,504,321 A | 4/1996 | Sheldon | |
| 5,504,664 A | 4/1996 | Ostema | |
| 5,506,394 A | 4/1996 | Plesko | |
| 5,508,731 A | 4/1996 | Kohorn | |
| 5,510,828 A | 4/1996 | Lutterbach et al. | |
| 5,511,114 A | 4/1996 | Stimson et al. | |
| 5,512,654 A | 4/1996 | Holmes et al. | |
| 5,513,102 A | 4/1996 | Auriemma | |
| 5,516,598 A | 5/1996 | Visco et al. | |
| 5,521,363 A | 5/1996 | Tannenbaum | |
| 5,523,179 A | 6/1996 | Chu | |
| 5,523,794 A | 6/1996 | Mankovitz et al. | |
| 5,530,235 A | 6/1996 | Stefik et al. | |
| 5,532,689 A | 7/1996 | Bueno | |
| 5,535,147 A | 7/1996 | Jacobs et al. | |
| 5,541,583 A | 7/1996 | Mandelbaum | |
| 5,544,246 A | 8/1996 | Mandelbaum et al. | |
| 5,559,313 A | 9/1996 | Claus et al. | |
| 5,563,948 A | 10/1996 | Diehl et al. | |
| 5,568,441 A | 10/1996 | Sanemitsu | |
| 5,569,898 A | 10/1996 | Fisher et al. | |
| 5,572,004 A | 11/1996 | Raimann | |
| 5,577,109 A | 11/1996 | Stimson et al. | |
| 5,582,623 A | 12/1996 | Chu | |
| 5,585,787 A | 12/1996 | Wallerstein | |
| 5,590,038 A | 12/1996 | Pitroda | |
| 5,592,611 A * | 1/1997 | Midgely et al. | 714/4 |
| 5,594,493 A | 1/1997 | Nemirofsky | |
| 5,604,542 A | 2/1997 | Dedrick | |
| 5,613,095 A | 3/1997 | Moss | |
| 5,617,474 A | 4/1997 | Ditzig et al. | |
| 5,621,787 A | 4/1997 | McKoy et al. | |
| 5,629,977 A | 5/1997 | Fonesca | |
| 5,640,002 A * | 6/1997 | Ruppert et al. | 235/462.46 |
| 5,649,118 A | 7/1997 | Carlisle et al. | |
| 5,652,602 A | 7/1997 | Fishman et al. | |
| 5,663,766 A | 9/1997 | Size, II | |
| 5,664,110 A | 9/1997 | Green et al. | |
| 5,664,157 A | 9/1997 | Takahira et al. | |
| 5,672,678 A | 9/1997 | Holmes et al. | |
| 5,677,521 A | 10/1997 | Garrou | |
| 5,680,459 A | 10/1997 | Hook et al. | |
| 5,689,100 A | 11/1997 | Carrithers et al. | |
| 5,690,412 A | 11/1997 | Sheldon | |
| 5,696,824 A | 12/1997 | Walsh | |
| 5,698,837 A | 12/1997 | Furuta | |
| 5,703,755 A | 12/1997 | Flesher et al. | |
| 5,706,442 A * | 1/1998 | Anderson et al. | 705/27 |
| 5,710,458 A | 1/1998 | Iwasaki | |
| 5,721,781 A | 2/1998 | Deo | |
| 5,727,153 A | 3/1998 | Powell | |
| 5,728,998 A | 3/1998 | Novis et al. | |
| 5,734,154 A | 3/1998 | Jachimowica et al. | |
| 5,736,727 A | 4/1998 | Nakarta et al. | |
| 5,736,728 A | 4/1998 | Matsubara | |
| 5,744,789 A | 4/1998 | Kashi | |
| 5,747,784 A * | 5/1998 | Walker et al. | 235/383 |

| | | | | | | |
|---|---|---|---|---|---|---|
| 5,751,953 A | 5/1998 | Shiels et al. | 6,025,283 A | 2/2000 | Roberts | |
| 5,760,381 A | 6/1998 | Stitch et al. | 6,027,028 A | 2/2000 | Pieterse | |
| 5,761,624 A | 6/1998 | Mooney et al. | 6,030,720 A | 2/2000 | Chu | |
| 5,763,862 A | 6/1998 | Jachimowitz et al. | 6,036,099 A | 3/2000 | Leighton | |
| 5,767,896 A | 6/1998 | Nemirofsky | 6,041,965 A | 3/2000 | Smith | |
| 5,770,843 A | 6/1998 | Rose et al. | 6,045,042 A | 4/2000 | Ohno | |
| 5,770,849 A | 6/1998 | Novis et al. | 6,049,463 A | 4/2000 | O'Malley et al. | |
| 5,777,305 A | 7/1998 | Smith et al. | 6,056,199 A | 5/2000 | Wiklof et al. | |
| 5,777,306 A | 7/1998 | Masuda | 6,081,792 A * | 6/2000 | Cucinotta et al. | 705/43 |
| 5,777,903 A | 7/1998 | Piosenka et al. | 6,087,954 A | 7/2000 | McSpadden | |
| 5,778,067 A | 7/1998 | Jones et al. | 6,089,284 A | 7/2000 | Kaehler | |
| 5,789,732 A | 8/1998 | McMahon et al. | 6,089,456 A | 7/2000 | Walsh et al. | |
| 5,789,733 A | 8/1998 | Jachimowicz et al. | 6,091,817 A | 7/2000 | Bertina | |
| 5,793,502 A | 8/1998 | Bianco et al. | 6,092,057 A * | 7/2000 | Zimmerman et al. | 705/44 |
| 5,796,827 A | 8/1998 | Coppersmith et al. | 6,092,669 A | 7/2000 | Kushiya | |
| 5,804,806 A | 9/1998 | Haddad et al. | 6,095,072 A | 8/2000 | Kaufhold | |
| 5,806,044 A | 9/1998 | Powell | 6,095,412 A | 8/2000 | Bertina | |
| 5,806,045 A | 9/1998 | Biorge et al. | 6,105,866 A * | 8/2000 | Morrison et al. | 235/383 |
| 5,807,627 A | 9/1998 | Friend et al. | 6,107,562 A | 8/2000 | Hashimoto | |
| 5,815,127 A | 9/1998 | Jacobs et al. | D431,037 S | 9/2000 | Wilson | |
| 5,815,658 A | 9/1998 | Kuriyama | D431,039 S | 9/2000 | Wilson | |
| 5,817,207 A | 10/1998 | Leighton | D431,252 S | 9/2000 | Wilson | |
| 5,819,234 A | 10/1998 | Slavin et al. | 6,116,505 A | 9/2000 | Withrow | |
| 5,825,884 A * | 10/1998 | Zdepski et al. | 705/78 | 6,121,069 A | 9/2000 | Boyko et al. | |
| 5,828,044 A | 10/1998 | Jun et al. | 6,124,545 A | 9/2000 | Bauer | |
| 5,832,090 A | 11/1998 | Raspotnik | D431,573 S | 10/2000 | Wilson | |
| 5,844,230 A | 12/1998 | Lalonde | D432,141 S | 10/2000 | Wilson | |
| 5,845,256 A * | 12/1998 | Pescitelli et al. | 705/4 | D432,548 S | 10/2000 | Wilson | |
| 5,853,498 A | 12/1998 | Beneking | D432,552 S | 10/2000 | Wilson | |
| 5,854,595 A | 12/1998 | Williams | D433,031 S | 10/2000 | Wilson | |
| 5,857,079 A | 1/1999 | Claus et al. | D433,032 S | 10/2000 | Wilson | |
| 5,857,709 A | 1/1999 | Chock | D433,033 S | 10/2000 | Wilson | |
| 5,859,419 A | 1/1999 | Wynn | D433,034 S | 10/2000 | Wilson | |
| 5,859,779 A | 1/1999 | Giordano et al. | D433,035 S | 10/2000 | Wilson | |
| 5,870,155 A | 2/1999 | Erlin | D433,036 S | 10/2000 | Wilson | |
| 5,877,941 A | 3/1999 | Ryu | D433,037 S | 10/2000 | Wilson | |
| 5,880,452 A | 3/1999 | Plesko | D433,059 S | 10/2000 | Okumura | |
| 5,880,769 A | 3/1999 | Nemirofsky et al. | 6,128,599 A | 10/2000 | Walker et al. | |
| 5,882,812 A | 3/1999 | Visco | 6,130,623 A | 10/2000 | MacLellan et al. | |
| 5,884,271 A | 3/1999 | Pitroda | D433,420 S | 11/2000 | Wilson | |
| 5,887,271 A | 3/1999 | Powell | D433,421 S | 11/2000 | Wilson | |
| 5,889,268 A | 3/1999 | Swartz | D433,422 S | 11/2000 | Wilson | |
| 5,890,135 A | 3/1999 | Powell | D433,423 S | 11/2000 | Wilson | |
| 5,907,142 A | 5/1999 | Kelsey | D433,424 S | 11/2000 | Wilson | |
| 5,920,177 A | 7/1999 | Davis | D434,041 S | 11/2000 | Burke | |
| 5,920,844 A | 7/1999 | Hotta et al. | 6,144,848 A | 11/2000 | Walsh et al. | |
| 5,921,263 A | 7/1999 | Negley | 6,146,741 A | 11/2000 | Ogawa et al. | |
| 5,923,735 A * | 7/1999 | Swartz et al. | 379/93.12 | 6,156,967 A | 12/2000 | Ralph | |
| 5,928,336 A | 7/1999 | Takeuchi | 6,156,968 A | 12/2000 | Nishimoto | |
| 5,928,439 A | 7/1999 | Ota | 6,164,548 A | 12/2000 | Curiel | |
| 5,930,217 A | 7/1999 | Kayanuma | 6,170,745 B1 | 1/2001 | Schilling | |
| 5,932,994 A | 8/1999 | Jo | D437,882 S | 2/2001 | Creighton | |
| 5,952,639 A | 9/1999 | Ohki et al. | 6,188,309 B1 | 2/2001 | Levine | |
| 5,952,641 A | 9/1999 | Korshun | 6,193,156 B1 | 2/2001 | Han et al. | |
| 5,952,642 A * | 9/1999 | Lutz | 235/383 | 6,213,395 B1 * | 4/2001 | Dejaeger et al. | 235/383 |
| 5,955,961 A | 9/1999 | Wallerstein | 6,214,155 B1 | 4/2001 | Leighton | |
| RE36,356 E | 10/1999 | Gloton et al. | 6,219,692 B1 * | 4/2001 | Stiles | 709/201 |
| 5,962,837 A | 10/1999 | Main et al. | 6,230,970 B1 | 5/2001 | Walsh et al. | |
| 5,967,264 A * | 10/1999 | Lutz et al. | 186/61 | 6,250,555 B1 | 6/2001 | Inamoto | |
| 5,973,600 A | 10/1999 | Mosher, Jr. | 6,294,241 B1 | 9/2001 | Kaule et al. | |
| 5,979,757 A * | 11/1999 | Tracy et al. | 235/383 | 6,298,373 B1 * | 10/2001 | Burns et al. | 709/203 |
| 5,988,503 A | 11/1999 | Kuo | 6,308,887 B1 | 10/2001 | Korman et al. | |
| 5,995,372 A | 11/1999 | Asakura | 6,315,195 B1 | 11/2001 | Ramachandran | |
| 6,002,383 A | 12/1999 | Shimada | 6,318,536 B1 | 11/2001 | Korman | |
| 6,003,008 A | 12/1999 | Postrel et al. | 6,318,636 B1 | 11/2001 | Reynolds et al. | |
| 6,003,770 A | 12/1999 | Schilling | 6,327,575 B1 * | 12/2001 | Katz | 705/16 |
| 6,004,681 A | 12/1999 | Epstein et al. | 6,328,342 B1 | 12/2001 | Belousov et al. | |
| 6,005,183 A | 12/1999 | Akai | 6,329,920 B1 | 12/2001 | Morrison et al. | |
| 6,006,775 A | 12/1999 | Negley | 6,337,752 B1 | 1/2002 | Heckenkamp et al. | |
| 6,014,133 A | 1/2000 | Yamakado et al. | 6,354,498 B1 * | 3/2002 | Lutz | 235/385 |
| 6,014,636 A * | 1/2000 | Reeder | 705/17 | 6,363,355 B1 * | 3/2002 | Morrison et al. | 705/23 |
| 6,016,954 A | 1/2000 | Abe et al. | 6,366,220 B1 | 4/2002 | Elliott | |
| 6,019,284 A | 2/2000 | Fremman et al. | 6,370,580 B2 * | 4/2002 | Kriegsman | 709/226 |

| | | |
|---|---|---|
| 6,371,375 B1 | 4/2002 | Ackley et al. |
| 6,382,506 B1 | 5/2002 | Van Der Valk |
| 6,441,736 B1 | 8/2002 | Leighton |
| 6,471,128 B1 | 10/2002 | Corcoran et al. |
| 6,482,330 B1 | 11/2002 | Bajorek |
| 6,492,717 B1 | 12/2002 | Gore et al. |
| 6,514,367 B1 | 2/2003 | Leighton |
| 6,533,180 B1 | 3/2003 | Wood |
| 6,549,912 B1 | 4/2003 | Chen |
| 6,557,766 B1 | 5/2003 | Leighton |
| 6,560,581 B1 | 5/2003 | Fox et al. |
| 6,587,835 B1 * | 7/2003 | Treyz et al. .................... 705/14 |
| 6,607,127 B2 | 8/2003 | Wong |
| 6,609,658 B1 | 8/2003 | Sehr |
| D481,068 S | 10/2003 | Blossom et al. |
| 6,631,849 B2 | 10/2003 | Blossom |
| 6,640,214 B1 * | 10/2003 | Nambudiri et al. ............ 705/26 |
| 6,641,050 B2 | 11/2003 | Kelley et al. |
| 6,644,551 B2 | 11/2003 | Clayman et al. |
| 6,702,181 B2 | 3/2004 | Ramachandran |
| 6,715,797 B2 | 4/2004 | Curiel |
| 6,734,887 B2 | 5/2004 | Field |
| D490,840 S | 6/2004 | Arakaki et al. |
| D491,186 S | 6/2004 | Arakaki et al. |
| D491,953 S | 6/2004 | Arakaki et al. |
| 6,749,122 B1 | 6/2004 | Koenck et al. |
| 6,749,123 B2 | 6/2004 | Lasch et al. |
| 6,764,014 B2 | 7/2004 | Lasch et al. |
| D496,365 S | 9/2004 | Liu et al. |
| 6,796,490 B1 | 9/2004 | Drummond et al. |
| 6,809,952 B2 | 10/2004 | Masui |
| D498,236 S | 11/2004 | Liu et al. |
| 6,830,181 B1 | 12/2004 | Bennett |
| 6,857,566 B2 | 2/2005 | Wankmueller |
| 6,945,453 B1 | 9/2005 | Schwarz Jr. |
| 6,957,334 B1 | 10/2005 | Goldstein |
| 6,965,868 B1 | 11/2005 | Bednarek |
| 7,025,256 B1 | 4/2006 | Drummond et al. |
| 7,040,533 B1 | 5/2006 | Ramachandran |
| 7,051,925 B2 | 5/2006 | Schwarz, Jr. |
| 7,150,393 B1 | 12/2006 | Drummond et al. |
| 7,156,301 B1 | 1/2007 | Bonalle et al. |
| 7,228,155 B2 | 6/2007 | Saunders |
| 7,249,112 B2 | 7/2007 | Berardi et al. |
| 7,306,141 B1 | 12/2007 | Schwarz, Jr. |
| 7,311,244 B1 | 12/2007 | Schwarz, Jr. |
| 7,312,707 B1 | 12/2007 | Bishop et al. |
| 7,349,866 B2 | 3/2008 | Schwarz, Jr. |
| 7,493,288 B2 | 2/2009 | Biship et al. |
| 2001/0011250 A1 | 8/2001 | Paltenghe et al. |
| 2001/0027441 A1 | 10/2001 | Wankmueller |
| 2001/0038033 A1 | 11/2001 | Habib |
| 2002/0008145 A1 | 1/2002 | Walsh |
| 2002/0030579 A1 * | 3/2002 | Albert et al. .................. 340/5.9 |
| 2002/0117846 A1 | 8/2002 | Kaule et al. |
| 2002/0178063 A1 | 11/2002 | Gravelle et al. |
| 2003/0009382 A1 | 1/2003 | D'Arbeloff et al. |
| 2003/0024995 A1 | 2/2003 | Conner et al. |
| 2003/0047253 A1 | 3/2003 | Robinson et al. |
| 2003/0132301 A1 | 7/2003 | Selker |
| 2003/0167207 A1 | 9/2003 | Berardi et al. |
| 2003/0187787 A1 | 10/2003 | Freund |
| 2003/0202151 A1 | 10/2003 | Hinata |
| 2003/0218066 A1 | 11/2003 | Fernandes et al. |
| 2003/0230631 A1 | 12/2003 | Tsunada et al. |
| 2004/0010449 A1 | 1/2004 | Berardi et al. |
| 2004/0029569 A1 | 2/2004 | Khan et al. |
| 2004/0049451 A1 | 3/2004 | Berardi |
| 2004/0094624 A1 | 5/2004 | Fernandes et al. |
| 2004/0117514 A1 | 6/2004 | Nelms et al. |
| 2004/0118930 A1 | 6/2004 | Berardi et al. |
| 2004/0121257 A1 | 6/2004 | Kaminsky et al. |
| 2004/0124248 A1 | 7/2004 | Selker |
| 2004/0149544 A1 | 8/2004 | Dal Ferro |
| 2004/0159700 A1 | 8/2004 | Khan et al. |
| 2004/0159708 A1 | 8/2004 | Yogev et al. |
| 2004/0159709 A1 | 8/2004 | Ohta et al. |
| 2004/0169088 A1 | 9/2004 | Nelms et al. |
| 2004/0182936 A1 | 9/2004 | Koenck et al. |
| 2004/0199474 A1 | 10/2004 | Ritter |
| 2004/0210498 A1 | 10/2004 | Freund |
| 2004/0217178 A1 | 11/2004 | Lasch et al. |
| 2004/0230488 A1 | 11/2004 | Beenau et al. |
| 2004/0232220 A1 | 11/2004 | Beenau et al. |
| 2004/0232221 A1 | 11/2004 | Beenau et al. |
| 2004/0232222 A1 | 11/2004 | Beenau et al. |
| 2004/0232223 A1 | 11/2004 | Beenau et al. |
| 2004/0232224 A1 | 11/2004 | Beenau et al. |
| 2004/0233037 A1 | 11/2004 | Beenau et al. |
| 2004/0233038 A1 | 11/2004 | Beenau et al. |
| 2004/0233039 A1 | 11/2004 | Beenau et al. |
| 2004/0236699 A1 | 11/2004 | Beenau et al. |
| 2004/0236700 A1 | 11/2004 | Beenau et al. |
| 2004/0236701 A1 | 11/2004 | Beenau et al. |
| 2004/0238621 A1 | 12/2004 | Beenau et al. |
| 2004/0239480 A1 | 12/2004 | Beenau et al. |
| 2004/0239481 A1 | 12/2004 | Beenau et al. |
| 2004/0252012 A1 | 12/2004 | Beenau et al. |
| 2004/0256469 A1 | 12/2004 | Faenza et al. |
| 2004/0257197 A1 | 12/2004 | Beenau et al. |
| 2004/0260646 A1 | 12/2004 | Berardi et al. |
| 2005/0004866 A1 | 1/2005 | Bonalle et al. |
| 2005/0006481 A1 | 1/2005 | Han et al. |
| 2005/0012326 A1 | 1/2005 | Keller et al. |
| 2005/0023359 A1 | 2/2005 | Saunders |
| 2005/0033619 A1 | 2/2005 | Barnes et al. |
| 2005/0033686 A1 | 2/2005 | Peart et al. |
| 2005/0033687 A1 | 2/2005 | Beenau et al. |
| 2005/0033688 A1 | 2/2005 | Peart |
| 2005/0033689 A1 | 2/2005 | Bonalle et al. |
| 2005/0035847 A1 | 2/2005 | Bonalle et al. |
| 2005/0038736 A1 | 2/2005 | Saunders |
| 2005/0038741 A1 | 2/2005 | Bonalle et al. |
| 2005/0040242 A1 | 2/2005 | Beenau et al. |
| 2005/0060233 A1 | 3/2005 | Bonalle et al. |
| 2005/0071231 A1 | 3/2005 | Beenau et al. |
| 2005/0077349 A1 | 4/2005 | Bonalle et al. |
| 2005/0116024 A1 | 6/2005 | Beenau et al. |
| 2005/0116810 A1 | 6/2005 | Beenau et al. |
| 2005/0160003 A1 | 7/2005 | Berardi et al. |
| 2005/0171898 A1 | 8/2005 | Bishop et al. |
| 2005/0194453 A1 | 9/2005 | Conner et al. |
| 2006/0012473 A1 | 1/2006 | Bishop et al. |
| 2006/0041540 A1 | 2/2006 | Shannon et al. |
| 2006/0102729 A1 | 5/2006 | Gandel et al. |
| 2006/0124753 A1 | 6/2006 | Scholz et al. |
| 2006/0214008 A1 | 9/2006 | Asami et al. |
| 2007/0170264 A1 | 7/2007 | Lasch et al. |
| 2007/0203825 A1 | 8/2007 | Hanifin et al. |
| 2007/0265924 A1 | 11/2007 | Schwarz, Jr. |
| 2008/0010202 A1 | 1/2008 | Schwarz, Jr. |
| 2009/0043651 A1 | 2/2009 | Schwarz, Jr. |

FOREIGN PATENT DOCUMENTS

| | | |
|---|---|---|
| DE | 43 08 193 | 9/1994 |
| EP | 0 061 373 | 9/1982 |
| EP | 0 465 456 | 1/1992 |
| EP | 0 855 659 | 7/1998 |
| EP | 0 254 595 | 1/2008 |
| GB | 2 154 832 | 9/1985 |
| GB | 2 267 626 | 12/1993 |
| WO | WO 88/03296 | 5/1988 |
| WO | WO 90/14644 | 11/1990 |
| WO | WO 91/14237 | 9/1991 |
| WO | WO 94/22115 | 9/1994 |

| | | |
|---|---|---|
| WO | WO 97/24689 | 7/1997 |
| WO | WO 98/37524 | 8/1998 |
| WO | WO 00/49551 | 8/2000 |

OTHER PUBLICATIONS

Derfler, Frank J. et. al. How Networks Work, Millennium Ed., Que Corporation, Jan. 2000.*
Horngren, Charles T., and Sundem, Gary L., Introduction to Financial Accounting, Revised 3rd Ed., Prentice-Hall, Inc., 1988.*
Borland's Paradox for Windows User's Guide, Borland International, Inc, 1994.*
"A Player Goes After Big Bucks in Cyberspace" American Banker, May 5, 1998.
"A Different Drummer on the Data Highway" American Banker, May 12, 1995.
Machlis et al., Will smart cards replace ATMS?, Computerworld, printed Feb. 23, 2001, 3 pages.
Sotto, An RFID Code of Conduct, RFID Journal, Featured Opinions, May 30, 2005.
BSI2000 Files Patent Application for Optical Bank Card Press Release, printed Apr. 27, 2004.
Brehl, Banks issue cash-card pledge, the Toronto Star, Oct. 9, 1997, 1 page.
Card Flash, Daily Payment Card News, www.CardWeb.com, printed Aug. 10, 2004.
Rosen, Cash Just Isn't Flexible Enough: Shops of the Future Will Only Take Cards, Daily Express, Technology Section, Feb. 10, 1995, 1 page.
Hesseldahl, China Goes Smartcard Crazy, www.forbes.com, Jun. 12, 2001.
Schwartz, Digital Cash Payoff.
E-Z, Pass, Web page, http: //www.ezpass.com-Disc . . . portNewYork.html, Nov. 12, 2001..
E-Z Pass, Web page, http:\\www.ezpass.com-Disc_ny_annual.html, Nov. 12, 2001.
E-Z Pass, Well page, http:\\www.ezpass.com-frame.Main.hrml, Nov. 12, 2001.
E Z Pass, Web page, http:\\www.ezpass.com-whatishtml, Nov. 12, 2001.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Frequently asked questions, ECARD, www.eregard.com, printed Sep. 23, 2001, 7 pages.
Machlis, Have it the smart way: Barger King program drives smart-card use, Computerworld, printed Feb. 23, 2001, 1 page.
Nokia Announces the World's First NFC Enahled Mobile Product for Contactless Payment and Ticketing, PRNewswire, Feb. 9, 2005.
Proton world and Europay to co-operate in creation of new CEPS-compliant e-purse application, Press Release. 1999, Waterloo, Belgium, Jun. 28, 1999, 2 pages.
Purse Application for Cross Border Use in Euro, Gordis, Pace 1st 1999-11531 Pace, www,cordis.lu, printed Feb. 23, 2001, 3 pages.
RFID Tags, Comactless Smart Card Technology and Electionic Passports: Frequently Asked Questions, www.smartcardalliance.org, Feb. 17, 2005.
RFID Tags, Contactless Smart Card Technology: Comparing and Contrasting Applications and Capabilties, www.smartcardalliance.org, Feb. 17, 2005.
SK100 Smart Card Electronic Purse Balance Reader, SK100 Balance Reader, http://perso.wanadoo.fr, printed Feb. 23, 2001, 1 page.
Gilhooly, Smart Cards, Smart Move?, Computerworld, May 21, 2001, pp. 1-5.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Dvorak, Smartcards Get Smatter, www.forbes.com, Jun. 1, 2001.
Hesseldahl, Stock Focus; Smartcard Companies, wwwforbes.com, Jun. 18, 2001.
The Electronic Purse Reaches the Cat Park, http:\\docs.vircom.net/mobility/parking, printed Feb. 23, 2001, 2 pages.
Stuber, The electronic purse: An overview of recent development and issues, Bank of Canada, Technical Report No. 74, www.bankofcanada.ca, Jan. 1996, printed Feb. 23, 2001, 2 pages.
Transponders: Cash In A Flash, www.forbes.com, Jul. 31, 2001.
Hesseldahl, U.S. Getting Wise To Smart Cards, Forbes,com. May 25, 2000.
Understanding the benefits; Smartcity offers a number of important benefits to both the card issuers and their customers, http://www.icl.com/smartcards/benefits.htm, printed Feb. 27, 2001, 2 pages.
Visa first to launch electronic purse load via GSM mobile phone, www.cellular.co.za, Johannesburg, ZA, printed Feb. 23, 2001, 4 pages.
Hansell, Visa to unveil electronic purse cards, New York Times, printed Feb. 23, 2001, 2 pages.
Visa, MBNA and De La Rue Launch Multi-Function Smart Card Program, www.findarticles.com, Jul. 6, 1996.
Machlis et al., Will smart cards replace ATMS?, Computerworld, printed Feb. 23, 2001, 3 pages.

* cited by examiner

SYSTEM AND METHOD FOR TRANSPONDER-ENABLED ACCOUNT TRANSACTIONS

RELATED APPLICATIONS

This application is a divisional application of application Ser. No. 09/630,595 filed on Aug. 1, 2000. The disclosure of this application is herein incorporated by reference in its entirety.

FIELD OF THE INVENTION

The invention relates to the field of electronic commerce, and more particularly to the use of transponder-activated account transactions at point of sale or other locations.

BACKGROUND OF THE INVENTION

The use of electromagnetically-coupled transducers for commercial transaction processing has become increasingly popular in recent times. The advent of compact, inexpensive electronics, transponder-equipped point of sale equipment, and attendant information processing assets have enabled a variety of vendors to offer account-linked transaction systems. Those systems include, for example, subway or other transportation devices, telephone calling devices, and others such as the SpeedPass™ offered by Mobil Corp. for gasoline point of sale transactions. In that and other systems, a receiver emits electromagnetic signals to a device in proximity to a gasoline pump over radio frequencies (RF), activating an embedded transponder within the traction device. The transaction device is identified by some sort of identification information, which information is then relayed from the point of sale to an offsite information processing facility. However, these types of distributed systems suffer from more than one disadvantage.

For one, transactions made according to that technology require that separate offsite computing facilities be accessed, since the transponder in encoded with information identifying the transponder but not the account information necessary to complete the transaction. Processing times and time to completion of transactions are therefore increased, and the expense of linking and maintaining information processing facilities to service the point of sale request is significant. Moreover, the initiation of new accounts to use such wireless vending points requires backend processing facilitates to enter a new user's account to the remote data processing facility, as well as to encode and associate the transponder with particular new accounts. More streamlined, convenient and flexible transaction technology is desirable.

SUMMARY OF THE INVENTION

The invention overcoming these and other drawbacks in the art relates to a system and method for transponder-activated transactions, generally involving the presentation and sensing of an electromagnetically coupled transponder to an RF-enabled point of sale system. In the practice of the invention, the transponder may be preferably encoded with not merely identifying or serializing information, but also account information which may be used to authorize or record transactions at the instant of sale, so that remote data processing may not be necessary. Users of the transponder of the invention may link the device to more than one type of account, and activate the transponder using Web or other network-enabled interfaces.

BRIEF DESCRIPTION OF THE DRAWINGS

The invention will described with reference to the accompanying drawings, in which like elements are referenced by like numerals.

DETAILED DESCRIPTION OF PREFERRED EMBODIMENTS

Figure 1:
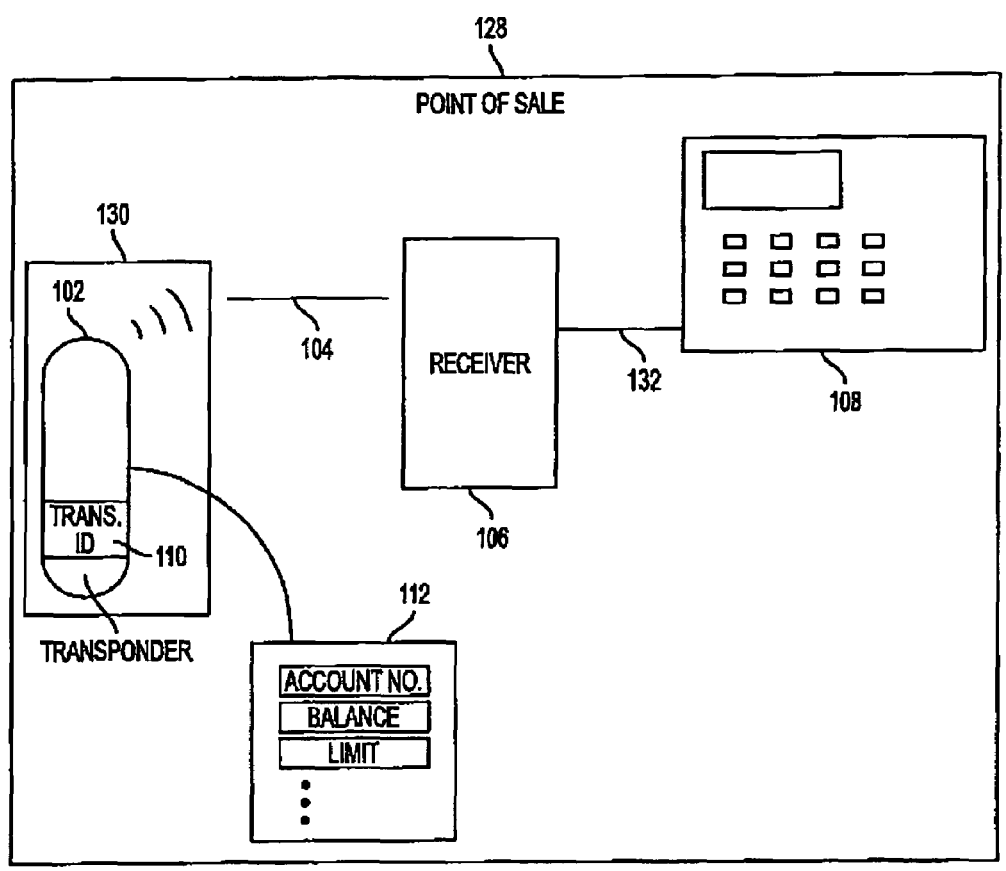
FIG. 1 illustrates an overall transaction architecture according to one embodiment of the invention.

As illustrated in FIG. 1, in a first embodiment of the invention, an overall point of sale architecture includes a transponder 102 which communicates via an RF link 104 to a receiver 106. The transponder 102 may be or include any of several known electromagnetically coupled devices, generally activated by proximity to an RF-enabled receiving unit, such as receiver 106. Transponder 102 may, for instance, contain an electromagnetic coil antenna for inductive coupling to receiver 106, thereby being energized with small but sufficient electric current to activate embedded electronics within transponder 102. Those electronics may include memory such as CMOS memory, logic gates, filters for isolating discrete transmission frequencies and other elements known in the art. In one embodiment, transponder 102 may be programmable and able to receive updated programmable instructions via RF link 104, as well as to have electronic memory erased or updated during transactions. Receiver 106 may include an electromagnetic antenna to couple with transponder 102, generally within the range of a few feet of the device.

In the embodiment illustrated in FIG. 1, the receiver 106 is connected via connection 132 to a point of sale (POS) device 108 for conducting a commercial or other transaction. For instance, the point of sale device 108 may be or include any of several commercially known electronic cash registers or related transaction processing equipment, such as point of sale terminals manufactured by Sharp Corp. or others. In one embodiment of the invention, transponder 102 may be embedded within a personal article 130 for convenience, aesthetic and affinity purposes. In that regard, the invention has been integrated in one implementation within a fully functional watch manufactured by the Swatch Corporation. Embedding in other personal articles 130, such as key chains, pagers, clothing or other items is also possible.

In the operation of the invention, a user who has subscribed to the account system of the invention may approach the receiver 106 at the point of sale device 108 to initiate and complete a purchase or other transaction, such as at a restaurant or grocery market checkout line, or other points of sale 128. In the embodiment illustrated in FIG. 1, transponder 102 contains an encoded transponder ID 110, which may for instance be a 5-digit number or other identifying information. In this embodiment, transponder 102 may also store an account table 112 directly recording account information for the subscribed user of the transponder 102. The account table 112 may be or include, for instance, an indication of an account number, balance, limit and other information for a debit account, a cash account, a credit card account, special premises account for internal use such as by employees, or other account information associated with users of the system.

In the implementation of this embodiment of the invention, receiver 106 is configured to receive the account table 112 and apply an amount being executed at the point of sale device 108 to the account reflected within the account table 112. For instance, a patron who has subscribed to an account according to the system of the invention may approach receiver 106 in a restaurant line and wave a watch or other article containing transponder 102 in proximity of the receiver 106. When transponder 102 comes within range of receiver 106, transponder 102 may be inductively coupled to the coils of an electromagnetic antenna within receiver 106 inducing electrical energy within transponder 102, to establish the RF link 104 with the receiver 106. Upon activation of transponder 102 and radiation of transponder ID 110 to the receiver 106, the receiver 106 may respond with an acknowledge signal to the transponder 102. The point of sale device 108 may indicate on a display screen or otherwise that a transaction is ready to be commenced. Once the point of sale device 108 generates total amount due for the transaction, the receiver 106 may interrogate transponder 102 to obtain account table information from account table 112 for application to the sale.

For instance, if a patron has purchased a meal in a restaurant line at point of sale device 108, the total purchase price may be validated against available credit, available cash or other account-specified balances within account table 112 for completion of the transaction. Conversely, if the amount of the transaction cannot be validated against account table 112, the point of sale device 108 may indicate "cash required" or another message that transponder validation or authorization has failed. If the transaction amount is validated, receiver 106 enters the transaction amount, recalculates an account balance for storage within account table 112 and transmits the revised account table 112 information over the RF link 104 to the transponder 102. A transaction completion signal may be emitted by receiver 106, which in one embodiment may turn off or decouple the transponder 102 via RF link 104.

Among other advantages, because the receiver 106 and other transaction elements do not need to resort to offsite transaction processing, conduct of the transaction from initiation through approval and completion are completed quickly, often virtually instantaneously to a subscriber at the point of sale. It may be noted that receiver 106 and point of sale device 108 may be configured to execute a variety of other types of transactions, such as retail checkouts of books, movies or other media, and other transaction events.

Figure 3:
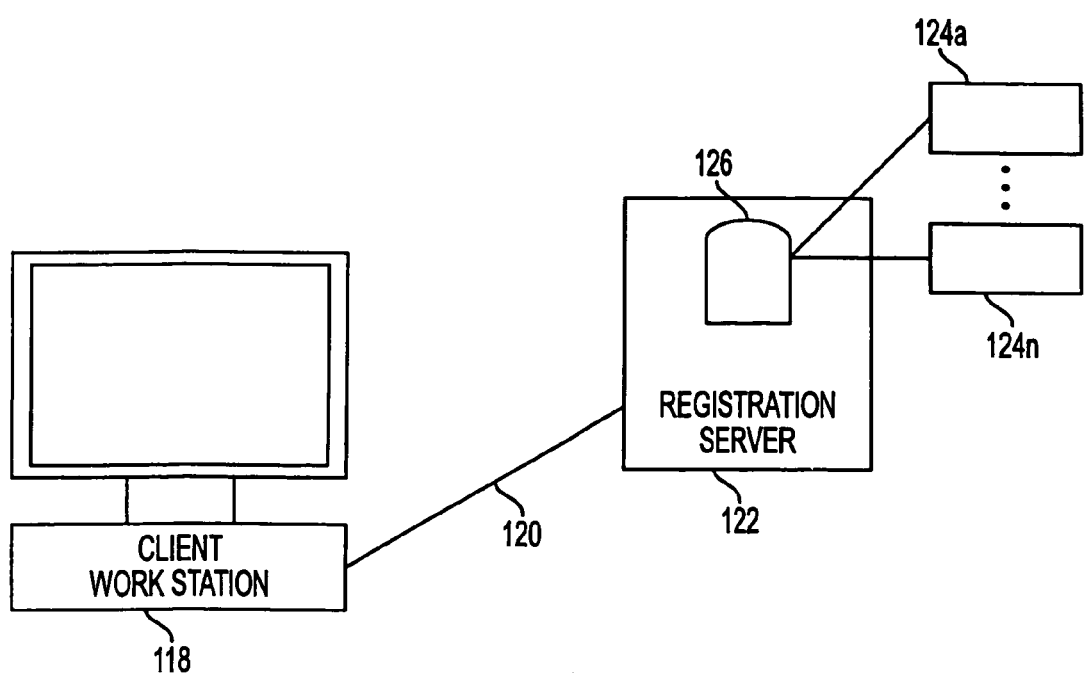
FIG. 3 illustrates an activation architecture for the initiation of user accounts according to the invention.

In terms of new accounts registration as illustrated in FIG. 3, in the invention a network-based activation architecture may be advantageously employed. As shown in the figure, a new user may access a client work station 118 connected via communications link 120 to a registration server 122. The communications link 120 may be, include or access any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDN (Fiber Distributed Data Networks) or CDDI (Copper Distributed Data Interface) connections.

Communications link 120 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

The registration server 122 may be or include, for instance, a workstation running the Microsoft Windows™ NT™, Windows™ 2000, Unix, Linux, Xenix, IBM AIX, Hewlett-Packard UX, Novell Netware™, sun Microsystems Solaris™, OS/2™, BeOS™, Mach, Apache, OpenStep™ or other operating system or platform.

The registration server 122 may communicate with client workstation 118 to receive preassigned information related to transponder 102, such as transponder ID 110 which may be printed by sticker on a watch or other article housing the device, for entry into a database 126 within registration server 122 and the setting up of an account. The account may illustratively include or be more than one type of account 124*a* . . . 124*n*, such as cash accounts, debit accounts, credit card accounts, special purpose vending accounts, telephone card accounts, or others. The registration server 122 may validate the transponder ID 110, and interrogate a new subscriber at client work station 118 to identify or select which one or more of accounts 124*a* . . . 124*n* the user wishes to associate with the transponder 102.

For instance, the registration 122 may accept a preexisting credit card number for registration with the transponder 102 and execution of future transactions. Once new account information is established, the registration server 122 may communicate via network connection to receiver 106 to update subscriber registration tables within the database 126, receiver 106, point of sale device 108 or other associated hardware to authorize transactions at the point of sale. The paperwork, delay, possibility for error and other drawbacks of paper-based back end account registration is thereby avoided.

Figure 2:
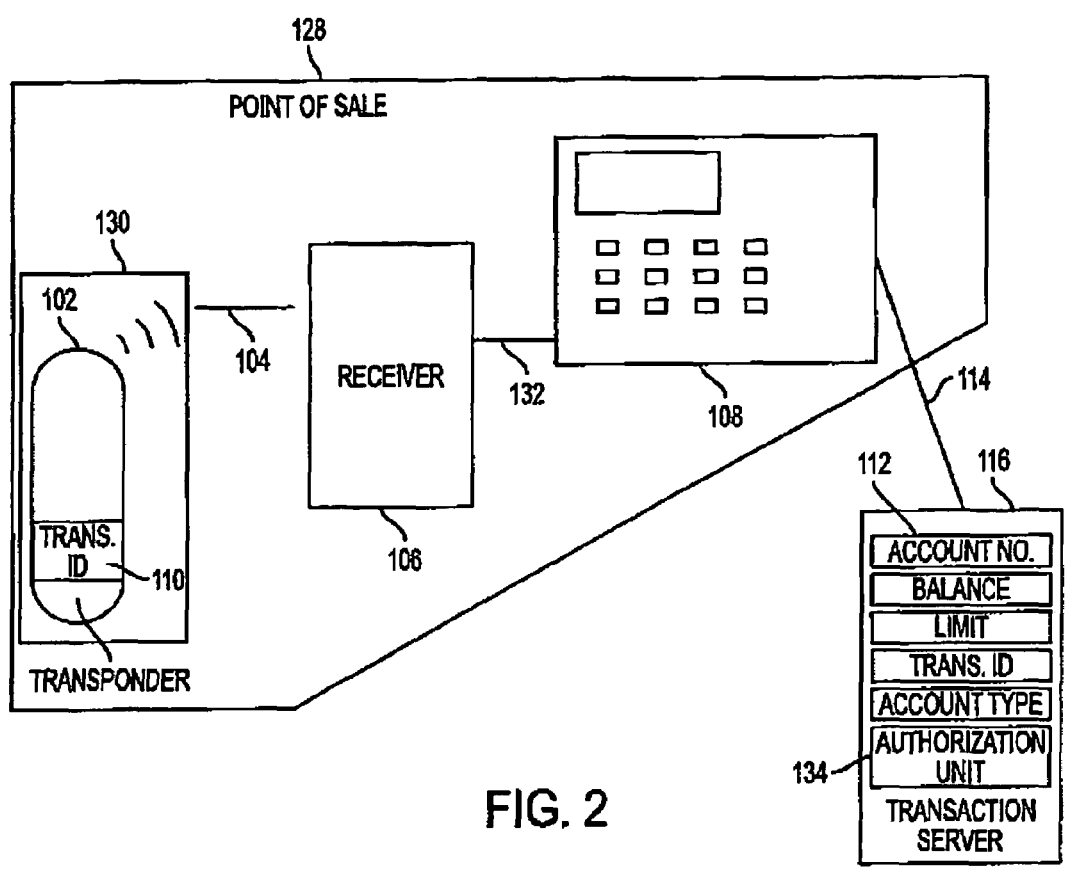
FIG. 2 illustrates an overall architecture of the invention according to a second embodiment of the invention.

A second illustrative embodiment of the invention is shown in FIG. 2, generally involving a processing architecture similar to that of FIG. 1. In this embodiment, a transponder 102 again communicates via RF link 104 with receiver 106 to effectuate point of sale or other transactions. However, in the embodiment of FIG. 2 a portion or all of account table 112 or other information stored in transponder 102 in the first embodiment may be offloaded to economize on the necessary electronics, power consumption and other properties of transponder 102. In the embodiment illustrated in FIG. 2, the point of sale device 108 is additionally connected to a transaction server 116 via communications link 114, for the purpose of authorizing by a payment authorization unit 134 in whole or in part transactions presented for payment using transponder 102. Communications link 114 may be, include or access communications resources similar to communications link 120.

In this embodiment, part or all of the information of account table 112 may be stored in hard disk or other storage of transaction server 116. Transaction initiation begins in the same manner as the embodiment illustrated in FIG. 1, however, after acknowledgments are exchanged between point of sale device 108 and transponder 102 and a transaction is set up, the point of sale device 108 may communicate with transaction server 116 to validate by a payment authorization unit 134 a transaction amount or other information against account information stored in the transaction server 116.

While this implementation involves additional hardware and communications link 114, if transaction server 116 is co-located with the point of sale device 108, such as in a restaurant or retail outlet, communication delays may be minimal. Furthermore if the transaction server 116 is dedicated to processing transactions only at the site of point of sale device 108 or closely grouped facilities, processing burdens may be comparatively modest. In another embodiment of the invention, transaction server 116 may communicate with a payment authorizing unit 134 which may be located at remote credit file databases or other information resources before authorizing or completing a transaction initiated over RF link 104 at receiver 106, when circumstances may permit some execution delay to be acceptable. Alternatively, in another embodiment of the invention the point of sale device 108 may perform a preliminary authorization for transactions presented at the receiver 106, to collect and temporarily store transactions, for instance over 2 or 3 hour periods, for batch processing remotely via transaction server 116. Since the majority of transactions typically reconcile without difficulty, this implementation permits more-immediate completion while still checking on account validations at frequent intervals.

Figure 4:
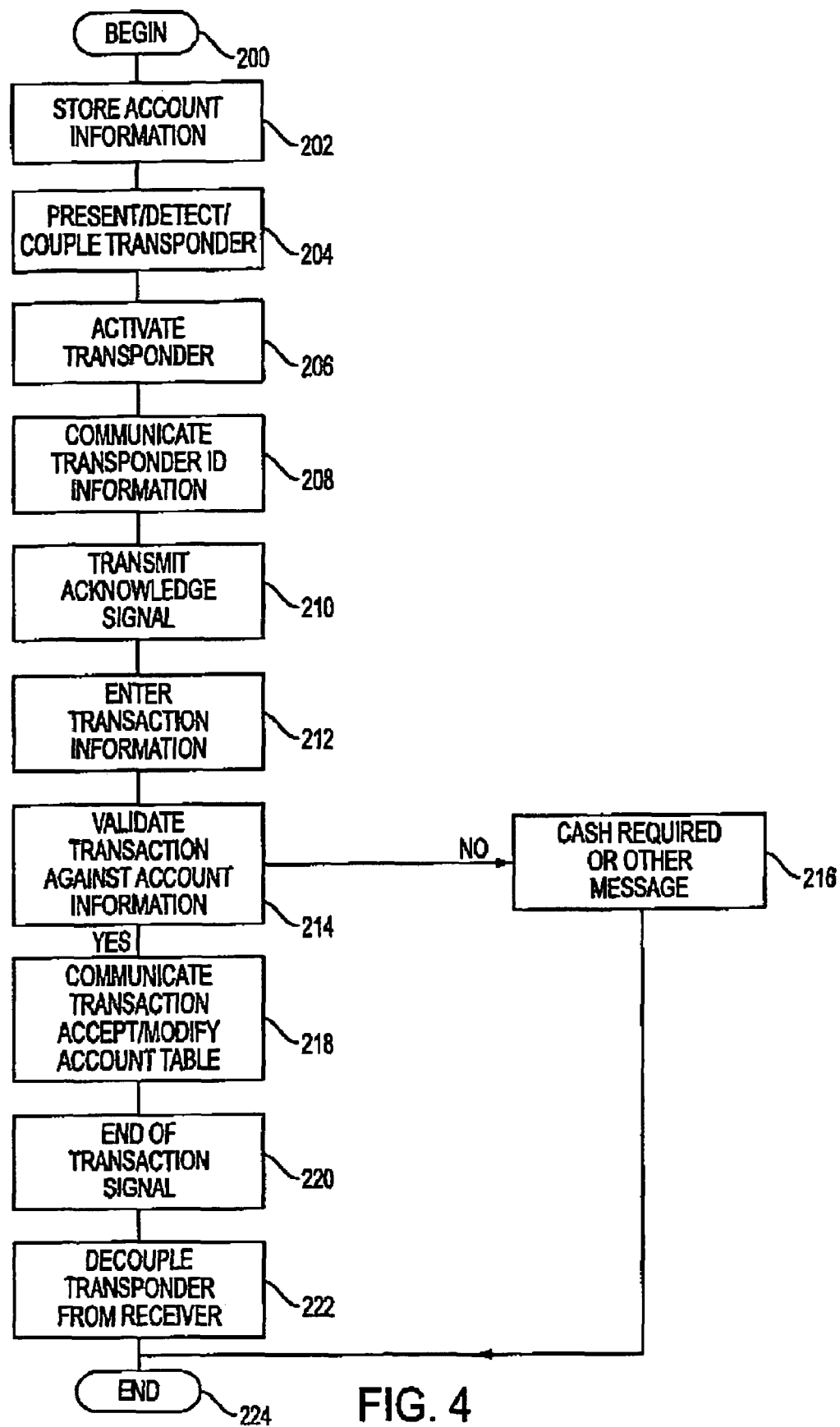
FIG. 4 illustrates a flowchart of transaction processing according to the invention.

Overall transaction processing is illustrated in the flowchart of FIG. 4. In step 202, processing begins. In step 204, the receiver 106 is presented with transponder 102 within range of electromagnetic coupling, such as inductive coupling. In step 206, transponder 102 is activated, for instance by inductive energization of its circuitry. In step 208 transponder 102 may communicate transponder ID 110, which the receiver 106 acknowledges with an acknowledge signal over RF link 104 in step 210.

In step 212, transaction information such as purchase amount is entered at point of sale device 108, for instance by a check out clerk or other attendant. In step 214, transaction table 112 or other account information may be interrogated to determine whether account balances or other account parameters permit the pending transaction at the point of sale device 108. If the transaction is not validated, in step 216 a "cash required" or other message is signaled at point of sale device 108, and processing proceeds to step 224 whole processing ends.

If the account to be applied to the pending transaction is validated at step 214, in step 218, the point of sale device 108 and receiver 106 communicate with transponder 102 to indicate transaction acceptance, and modify information within account table 112 if appropriate. In step 220, an end of transaction signal is sent to transponder 102 and in step 222, transponder 102 decouples from the receiver 106. In step 224, processing ends.

Figure 5:
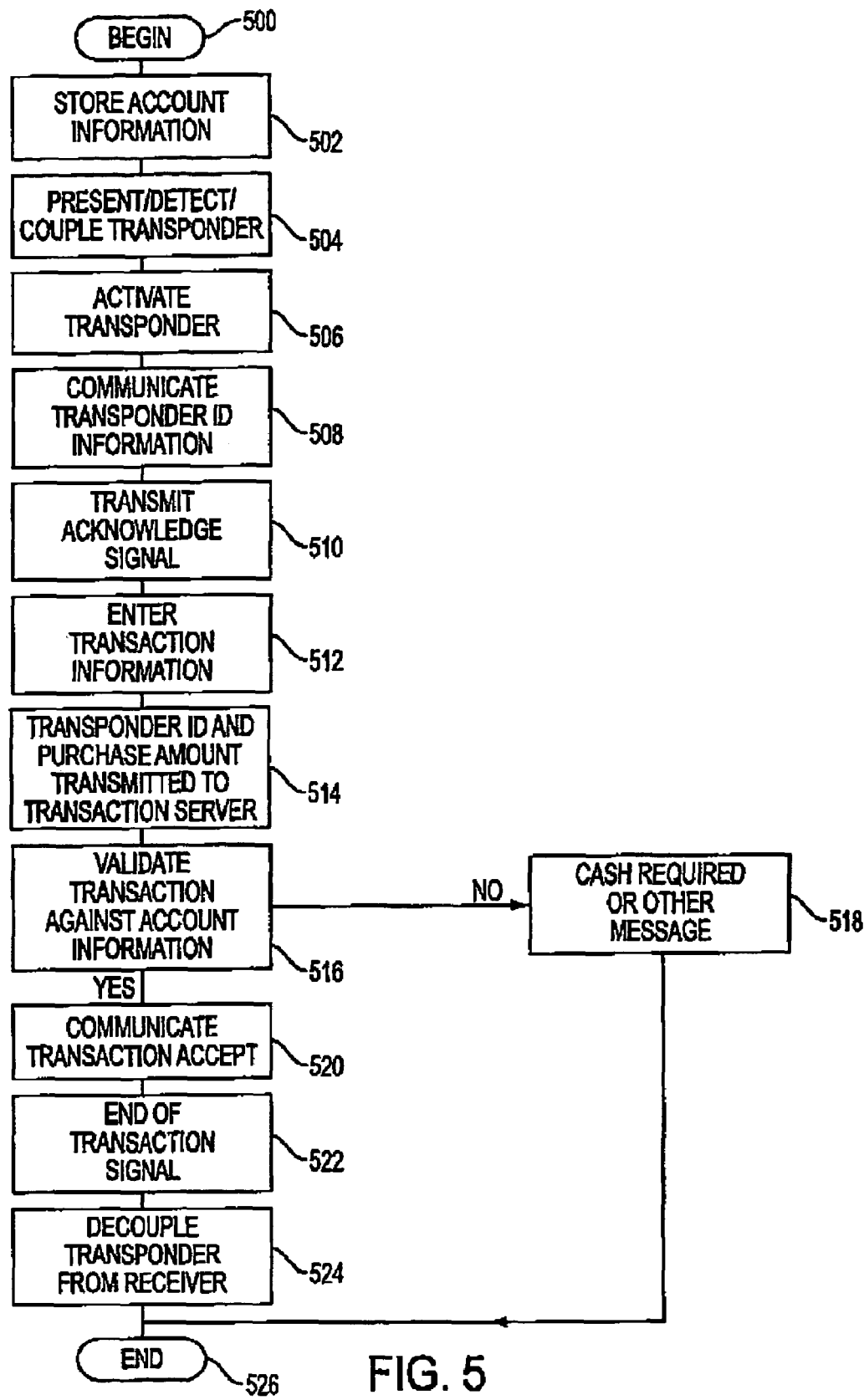

The overall transaction processing of an alternative embodiment is illustrated in the flowchart of FIG. 5. In step 502, processing begins. In step 504, the receiver 106 is presented with transponder 102 within range of electromagnetic coupling, such as inductive coupling. In step 506, transponder 506 is activated, for instance by inductive energization of its circuitry. In step 508, transponder 102 may communicate its transponder ID 110, which the receiver acknowledges with an acknowledge signal over RF link 104 in step 510.

In step 512, transaction information such as purchase amount is entered at point of sale device 108, for instance by a check out clerk or other attendant. In step 514, transponder ID 110 and purchase amount are received by the transaction server 116 via communications link 114. In step 516, financial account information in account table 112 may be interrogated to determine whether account balances or other account parameters permit the pending transaction at the point of sale device 108. If the transaction is not validated, in step 518 a "cash required" or other message is signaled at point of sale device 108, and processing proceeds to step 526 while processing ends.

If the account to be applied to the pending transaction is validated at step 516, in step 520, the authorization unit 118 communicates with point of sale device 108 to indicate transaction acceptance. In step 522, an end of transaction signal is sent to transponder 102 and in step 524, transponder 102 decouples from the receiver 106. In step 526, processing ends.

The foregoing description of the system and method for transponder-activated transactions is illustrative, and variations in configuration and implementation will occur to persons skilled in the art. For instance, while transponder 102 has been described as electromagnetically coupling with the receiver 106, or other types of detection and coupling could be used. For instance, an infrared device, a biometrically enabled or other device may be presented to corresponding detecting apparatus at the point of sale. Similarly, transponder 102 may contain or store other types or forms of information other than transponder ID 110 and account table 112. The scope of the invention is accordingly intended to be limited only by the following claims.

What is claimed:

1. A system for authorizing transponder-enabled transactions, comprising:
    a transaction server;
    a communications link between the transaction server and a point of sale device, wherein the point of sale device is associated with a merchant, the point of sale device in communication with a transponder identification information receiver, wherein at least some transponder identification information that is emitted from a transponder substantially upon presentation of both the transponder and a transaction for payment at the point of sale device is received by the transponder identification information receiver, communicated to the point of sale device via a connection between the transponder identification information receiver and the point of sale device, and then transmitted to the transaction server along with a payment amount for the transaction via the communication link between the point of sale device and the transaction server;
    an account table in communication with the transaction server;
    at least some financial account information representative of a financial account, wherein the financial account information is stored in the account table, the financial account information comprising at least one of financial account number information, financial account type information, financial account balance information, and financial account limit information, wherein at least some of the transponder identification information is linked to at least some of the financial account information;
    a payment authorization unit in communication with the transaction server and account table, wherein the payment authorization unit determines whether any of the payment amount is authorized to be applied to the financial account based on at least some of the financial account information and the payment amount, wherein the transaction server, account table and payment authorization unit are associated with at least one of an issuing bank or a credit network; and a registration unit in communication with the account table and at least one client workstation, wherein the registration unit receives the at least some financial account information and the at least some transponder identification information from the client workstation, wherein further the received financial account information is linked with at least some of the transponder identification information in the account table and the received financial account information is not previously linked to the transponder identification information.

2. The system of claim 1, wherein in the client workstation is accessed by a user.

3. The system of claim 1, wherein the financial account comprises a credit account, a debit account, a cash account, or a special premises account.

4. The system of claim 1, wherein the transponder and the transponder identification information receiver communicate via a wireless interface.

5. The system of claim 4, wherein the wireless interface comprises a RF interface.

6. The system of claim 4, wherein the wireless interface comprises an infrared interface.

7. The system of claim 1, further comprising multiple communications links between the transaction server and multiple point of sale devices.

8. The system of claim 1, wherein the financial account type information comprises one or more of a credit card account, a debit card account, a cash account, a telephone card account, a special premises account for use by employees of an entity, a stored value account, or a rewards account.

9. The system of claim 1, wherein the point of sale device comprises a cash register.

10. The system of claim 1, wherein the point of sale device is located at one or more of a restaurant, a grocery store, or a retail store.

11. The system of claim 1, wherein the transponder is embedded in a personal article.

12. The system of claim 11, wherein the personal article comprises a key chain, a pager, a watch, an article of clothing, a key, or a transaction card.

* * * * *